(12) United States Patent
Yang et al.

(10) Patent No.: US 11,951,575 B2
(45) Date of Patent: Apr. 9, 2024

(54) AUTOMATIC WELDING SYSTEM AND METHOD FOR LARGE STRUCTURAL PARTS BASED ON HYBRID ROBOTS AND 3D VISION

(71) Applicant: XI'AN CHISHINE OPTOELECTRONICS TECHNOLOGY CO., LTD, Xi'an (CN)

(72) Inventors: Tao Yang, Xi'an (CN); HuanHuan Li, Xi'an (CN); Lei Peng, Xi'an (CN); JunWei Jiang, Xi'an (CN); Li Ma, Xi'an (CN); QingFeng Liu, Xi'an (CN); NiNi Zhang, Xi'an (CN); Fang Wang, Xi'an (CN)

( * ) Notice: Subject to any disclaimer, the term of this patent is extended or adjusted under 35 U.S.C. 154(b) by 0 days.

(21) Appl. No.: 18/041,129

(22) PCT Filed: Jul. 15, 2022

(86) PCT No.: PCT/CN2022/106029
§ 371 (c)(1),
(2) Date: Feb. 9, 2023

(87) PCT Pub. No.: WO2023/193362
PCT Pub. Date: Oct. 12, 2023

(65) Prior Publication Data
US 2023/0390853 A1    Dec. 7, 2023

(30) Foreign Application Priority Data

Apr. 8, 2022  (CN) .......................... 202210362511.2

(51) Int. Cl.
*B23K 9/12*    (2006.01)
*B23K 9/00*    (2006.01)
(Continued)

(52) U.S. Cl.
CPC ............ *B23K 9/126* (2013.01); *B23K 9/0026* (2013.01); *B23K 9/0953* (2013.01); *B25J 5/005* (2013.01); *B25J 9/1692* (2013.01); *B25J 9/1697* (2013.01)

(58) Field of Classification Search
CPC .... B23K 9/126; B23K 9/0953; B23K 9/0026; B23K 9/1274; B25J 9/1692; B25J 9/1697; B25J 9/1664; B25J 5/005
See application file for complete search history.

(56) References Cited

U.S. PATENT DOCUMENTS

2022/0016776 A1*  1/2022  Lonsberry ................. G06T 7/70
2022/0258267 A1*  8/2022  Becker ................. G01B 11/002

FOREIGN PATENT DOCUMENTS

CN     112060103 A     12/2020
CN     112958959 A      6/2021
(Continued)

*Primary Examiner* — Brian W Jennison
(74) *Attorney, Agent, or Firm* — Novoclaims Patent Services LLC; Mei Lin Wong (57) ABSTRACT

Disclosed are an automatic welding system and method for large structural parts based on hybrid robots and 3D vision. The system comprises a hybrid robot system composed of a mobile robot and an MDOF robot, a 3D vision system, and a welding system used for welding. The rough positioning technique based on a mobile platform and the accurate recognition and positioning technique based on high-accuracy 3D vision are combined, so the working range of the MDOF robot in the XYZ directions is expanded, and flexible welding of large structural parts is realized. The invention adopts 3D vision, thus having better error tolerance and lower requirements for the machining accuracy of workpieces, positioning accuracy of mobile robots and placement accuracy of the workpieces; and the cost is reduced, the flexibility is improved, the working range is expanded, labor (Continued)

is saved, production efficiency is improved, and welding quality is improved.

7 Claims, 1 Drawing Sheet

(51) Int. Cl.
*B23K 9/095* (2006.01)
*B25J 5/00* (2006.01)
*B25J 9/16* (2006.01)

(56) References Cited

FOREIGN PATENT DOCUMENTS

| CN | 113634958 A | 11/2021 |
| CN | 113954085 A | 1/2022 |
| CN | 114434059 A | 5/2022 |

\* cited by examiner

AUTOMATIC WELDING SYSTEM AND METHOD FOR LARGE STRUCTURAL PARTS BASED ON HYBRID ROBOTS AND 3D VISION

BACKGROUND OF THE PRESENT INVENTION

The invention relates to the technical field of industrial automation and machine vision for automatic welding of large structural parts, in particular to an automatic welding system and method for large structural parts based on hybrid robots and 3D vision.

DESCRIPTION OF RELATED ARTS

Automatic welding based on robots has been used more and more widely to replace manual work to complete complex welding tasks. However, due to the limited arm reach of robots, the working range of the robots has to be expanded by means of external shafts to complete welding of large workpieces. Such external shafts typically comprise a bottom rail, a portal frame and a top rail. Existing schemes expand the working range of robots through such or similar structures to realize welding of large structural parts. For example, Chinese Patent Application No. 202111298122.X discloses an automatic welding system and method for large structural parts based on 3D vision, wherein the base of a multi-degree-of-freedom (MDOF) robot is mounted on a ground rail of an external shaft through a carriage. This scheme has the following drawbacks: (1) the precision requirement for the movement mechanism is high; however, when the moving distance of the movement mechanism is over several meters, accumulative errors will be caused, which have a great impact on the global positioning precision of the robots, so in order to guarantee the global positioning precision, precise guide rails or even grating scales have to be used for feedback to improve the precision, and the cost of the system is sharply increased and will grow in equal proportion with the increase of the moving distance of the movement mechanism; (2) a driver for controlling the extra external shaft and a corresponding external shaft motor have to be added to the robot system, which also increases the cost of the system. For these reasons, the accessories of the external shaft account for a large proportion of the cost of the robot welding system for large structural parts.

SUMMARY OF THE PRESENT INVENTION

To overcome the above-mentioned defects of the prior art, the objective of the invention is to provide an automatic welding system and method for large structural parts based on hybrid robots and 3D vision, which expand the working range of industrial robots through a mobile robot and accurately recognize and position the tail end through the 3D vision technique to automatically complete welding tasks, so the working range of the system is expanded, the flexibility of the system is improved, and the cost of the system is reduced.

The technical solution adopted by the invention to fulfill the above objective is as follows:

An automatic welding system for large structural parts based on hybrid robots and 3D vision comprises a hybrid robot system composed of a mobile robot and an MDOF robot installed above the mobile robot, a welding system installed at a tail end of the MDOF robot and used for welding a target workpiece, and a 3D vision system installed at the tail end of the MDOF robot or on the welding system, and used for global calibration and positioning of the hybrid robot system, the welding system and the target workpiece.

The mobile robot comprises a mobile robot chassis; a shell is fixedly disposed on the mobile robot chassis; a rechargeable battery pack and a power supply used for providing energy for the whole system, a controller of the MDOF robot, and a welding machine of the welding system are disposed in the shell; the rechargeable battery pack is connected to an external power supply through a power port on the shell;

The MDOF robot comprises an MDOF robot body, and the MDOF robot body and a teach pendant are in a signal connection with the controller in the shell through cables;

The welding system comprises the welding machine located in the shell, and a welding gun connected to the welding machine and disposed at the tail end of the MDOF robot body;

The 3D vision system comprises a 3D camera, the 3D camera is installed at the tail end of the MDOF robot body or on the welding gun, and is connected to an industrial personal computer on the shell through a cable, and the industrial personal computer is connected to the controller through a cable;

The measurement accuracy of the 3D camera is not lower than 0.5 mm, and a deep frame rate of the 3D camera is greater than one frame per second;

The MDOF robot has a robot arm with more than six degrees of freedom, and an arm reach of the robot arm is 0.5 m-2 m.

A welding method based on the automatic welding system for large structural parts based on hybrid robots and 3D vision comprises the following steps:

(1) Establishing a coordinate system of the hybrid robot system formed by the mobile robot and the MDOF robot;
(2) Calibrating a relation between the welding system and the coordinate system of the hybrid robot system and a relation between the 3D vision system and the coordinate system of the hybrid robot system;
(3) Placing the target workpiece in a working area, and aligning coordinates of the workpiece to a global coordinate system;
(4) Planning a motion path of the mobile robot, and a photographing position and pose of the 3D camera in the 3D vision system;
(5) Generating motion control and welding programs; and
(6) Performing welding by the mobile robot.

The invention has the following beneficial effects:
(1) Aiming at the features of large dimensions and poor consistency of large structural parts, hybrid robots and 3D vision are used to effectively improve the flexibility of the system and reduce the cost of the system;
(2) The hybrid robots and the 3D vision technique are combined, that is, the rough positioning technique based on a mobile platform and the accurate recognition and positioning technique based on high-accuracy 3D vision are combined, such that the working range of the MDOF robot in the XYZ directions is expanded, and flexible welding of large structural parts is realized. Compared with traditional a solution for expanding the working range of a robot through an external shaft, this solution is low in cost; and compared with the solution adopting the external shaft, this solution can expand the working range of the robot in the XY directions to a greater extent, and can expand the working range in the XY directions freely as long as the condition permits.

This solution has a great cost advantage in welding of large and ultra-large workpieces, and also has the advantages of occupying a small area and having no interference to hoisting of workpieces.

(3) Compared with traditional robot welding systems based on touch positioning and laser positioning, the invention adopts 3D vision, thus having better error tolerance and lower requirements for the machining and assembling accuracy of workpieces, positioning accuracy of mobile robots and placement accuracy of the workpieces; and the cost is reduced, the flexibility is improved, and the working range is expanded.

(4) The automatic welding system and method of the invention realize automatic welding of large structural parts, and compared with manual welding methods commonly used at present, labor is saved, production efficiency is improved, and welding quality is improved.

DETAILED DESCRIPTION OF THE PREFERRED EMBODIMENT

The invention will be described in detail below in conjunction with accompanying drawings.

Figure 1:
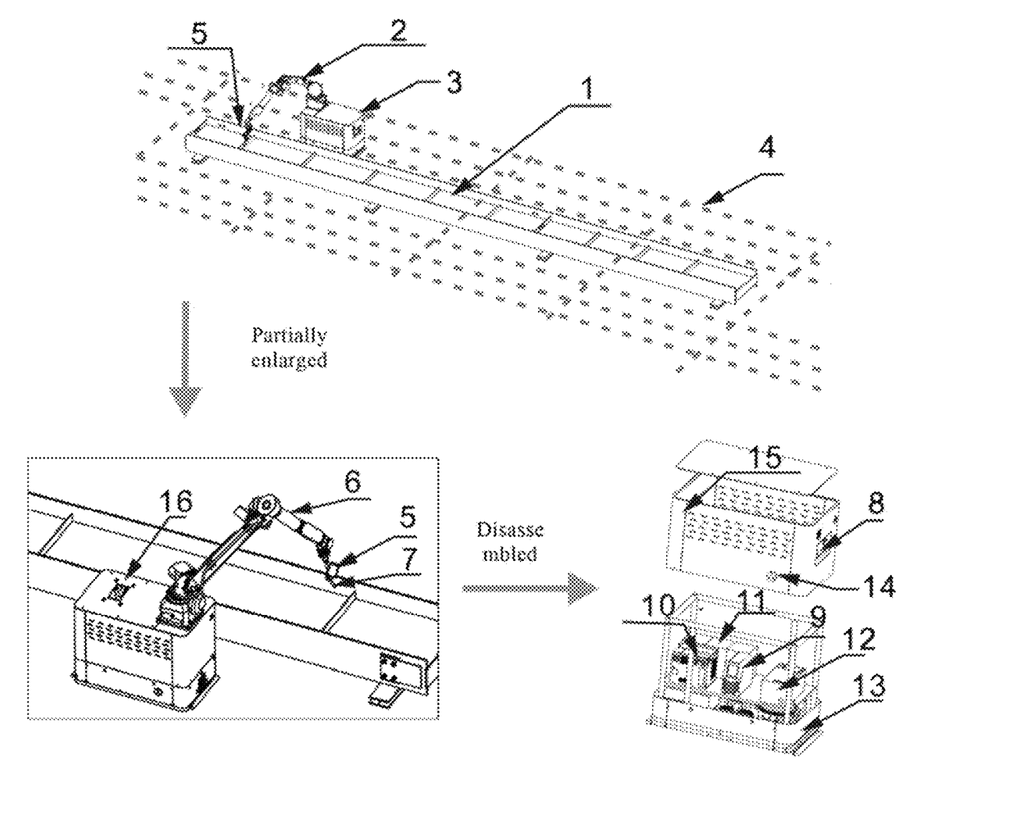
FIG. 1 is a structural diagram of a system according to the invention.

Referring to FIG. 1, the invention provides an automatic welding system and method for large structural parts based on hybrid robots and 3D vision, which expand the working range of industrial robots by means of a mobile robot and then accurately recognize and position a tail end through the 3D vision technique, so the working range of the system is expanded, the flexibility of the system is improved, and the cost of the system is reduced.

The automatic welding system for large structural parts based on hybrid robots and 3D vision comprises a hybrid robot system composed of a mobile robot 3 and an MDOF robot 2 installed above the mobile robot 3, a welding system installed at a tail end of the MDOF robot 2 and used for welding a target workpiece 1, and a 3D vision system installed at the tail end of the MDOF robot 2 or on the welding system, and used for global calibration and positioning of the hybrid robot system, the welding system and the target workpiece.

The mobile robot 3 comprises a mobile robot chassis 13, wherein the mobile robot chassis 13 comprises a movement module, a control module, a navigation sensor and structural members. A shell 15 is fixedly disposed on the mobile robot chassis 13, and a rechargeable battery pack 11 and a power supply 12 used for providing energy for the whole system, a controller 10 of the MDOF robot 2, and a welding machine 9 of the welding system are disposed in the shell 15, the rechargeable battery pack 11 is connected to an external power supply through a power port 14 on the shell 15, and when the whole system works, power is supplied by the rechargeable battery pack 11 or the power supply 12.

The mobile robot 3 is a mobile robot platform with a function of global navigational positioning, the spatial positioning accuracy of the mobile robot 3 is superior to 20 mm, the global navigational positioning is rough positioning realized by navigation through one or more of an electromagnetic method, a two-dimensional code method, visual SLAM, visual tracking, inertial navigation; when the electromagnetic method or two-dimensional code method is used for navigational positioning, corresponding navigation lines 4 are laid on the ground. When the vision tracking is used for positioning the mobile robot, one or more tracking targets 16 are printed on the shell 15 of the mobile robot 3, and cameras photograph the target to determine the position of the mobile robot. As an alternative solution, the target may be a specially designed light emitting or reflecting structure, which is directly installed on the mobile robot.

The mobile robot 3 is preferably a mobile robot platform with a lifting function. The controller 10 comprises: a controller used for controlling the movement of a robot motor and a driver used for driving the robot motor, which are collectively referred to as the controller.

The MDOF robot 2 comprises an MDOF robot body 6 rigidly installed on the mobile robot 3, the MDOF robot body 6 and a teach pendant are in a signal connection with the controller 10 in the shell 15 through cables, and the MODF robot 2 is carried by the mobile robot 3 to move, such that the working range of the MDOF robot is expanded. The MDOF robot 2 preferably has a robot arm with over six degrees of freedom, the robot arm is an industrial robot or a collaborative robot, and an arm reach of the robot arm is preferably 0.5 m-2 m.

The welding system comprises the welding machine 9 located in the shell 15, a welding gun connected to the welding machine 9, and other necessary components, wherein the welding gun 7 is disposed at the tail end of the MDOF robot body 6, and the other components comprise a wire feeder, a welding wire, a water tank, a protective gas, a storage device, and an air compressor, and are used for completing a whole welding process.

The 3D vision system comprises a 3D camera 5, wherein the 3D camera 5 is installed at the tail end of the MDOF robot body 6, or on the welding gun 7, or at other positions where the camera can photograph the target workpiece. The 3D camera 5 is connected to an industrial personal computer 8 on the shell 15 through a cable, and the industrial personal computer 8 can be installed at any suitable position of the shell 15 and is connected to the controller 10 through a cable.

The 3D camera 5 acquires 3D feature information of a workpiece to be welded, the measurement accuracy of the 3D camera 5 is not lower than 0.5 mm, the deep frame rate of the 3D camera 5 is greater than one frame per second; the 3D camera 5 is a low-power, small-size and light-weight 3D camera; and the 3D camera 5 preferably uses laser light as a light source to improve the light resistance. The 3D camera 5 is preferably a 3D camera based on MEMS structural light to meet the above feature requirements. The 3D camera 5 is provided with a protection device, which is used for protecting the camera against high temperature, splash and dust, to ensure normal work of the camera.

The target workpiece 1 is a large metal structural part suitable for welding, which means that at least one dimension of the workpiece is within 5 m-500 m; the target workpiece 1 is placed on a basic plane, which is a flat plane without ups and downs, preferably a horizontal plane; the mobile robot 3 carries the MDOF robot 2, the 3D vision system and the welding system, and moves around the target workpiece in the basic plane, is roughly positioned by navigation, and expands the working range in a direction perpendicular to the basic plane by ascending or descending.

A welding method based on the automatic welding system for large structural parts based on hybrid robots and 3D vision comprises the following steps:

(1) A coordinate system of the hybrid robot system formed by the mobile robot 3 and the MDOF robot 2 is established;
(2) A relation between the welding system and the coordinate system of the hybrid robot system and a relation between the 3D vision system and the coordinate system of the hybrid robot system are calibrated;
(3) The target workpiece 1 is placed in a working area, and coordinates of the workpiece are aligned to a global coordinate system;
(4) A motion path of the mobile robot 3, and a photographing position and pose of the 3D camera 5 in the 3D vision system are planned;
(5) Motion control and welding programs are generated; and
(6) Welding is performed by the mobile robot 3.
Step (1) specifically comprises:
(1.1) The mobile robot 3 carrying the MDOF robot 2, the 3D vision system and the welding system moves in a basic plane around the target workpiece 1, and is coarsely positioned by navigation, and expands the working range in a direction perpendicular to the basic plane by ascending or descending;
The mobile robot is roughly positioned by navigation through one or more of an electromagnetic method, a two-dimensional code method, visual SLAM, visual tracking and inertial navigation; when the electromagnetic method or the two-dimensional code method is used, corresponding navigation lines 4 are laid on the ground. When the visual tracking is used for positioning the mobile robot 3, one or more tracking targets 16 are printed on the shell 15 of the mobile robot 3, and two or more extra cameras photograph the target to determine the position of the mobile robot. As an alternative solution, the target may be a specially designed light emitting or reflecting structure which is directly installed on the mobile robot, such that cameras at different angels can observe the targets from any angles;
(1.2) The coordinate system of the hybrid robot system is established: a coordinate system of the mobile robot 3 is established, wherein an origin of the coordinate system is a fixed point in the basic plane, an XY plane is overlapped with the basic plane, a Z-direction is perpendicular to the basic plane, and the coordinate system is a global basic coordinate system; a coordinate system of the MDOF robot 2 is established, wherein for the convenience of operation, an origin of the coordinate system is located on a base of the robot arm, and an X-direction, a Y-direction and a Z-direction are overlapped with those of the coordinate system of the mobile robot 3; a coordinate system of the 3D vision system is established, wherein an original of the coordinate system is an optical center of a lens of the 3D camera 5, an X-direction of the coordinate system is an optical center of a projection system to which the optical center of the lens of the 3D camera 5 points, a Y-direction is perpendicular to the X-direction and is parallel to an imaging chip of the camera, and a Z-direction is perpendicular to the XY plane and points right ahead the camera.
Step (2) comprises the following three sub-steps:
(2.1) A coordinate relation between the MDOF robot 2 and the 3D camera 5 is calibrated to obtain a transformation relation between the coordinate system of the vision system of the camera and the coordinate system of the MDOF robot 2;

(2.11) First, it should be ensured that the 3D camera 5 is calibrated, and intrinsic parameters of the camera are obtained, wherein the intrinsic parameters comprise: focal length, position of a principal point, pixel size, resolution, and distortion parameters;
(2.12) Then, the 3D camera 5 and the MDOF robot 2 are calibrated, a homogeneous transformation matrix from the tail end of the MDOF robot 2 to the base of the robot is defined as $^{robot}T_{base}$, and similarly, a transformation matrix from the 3D camera 5 to a target object is defined as $^{cam}T_{obj}$; the 3D camera 5 is mounted on the MDOF robot 2 and photographs a calibration plate, coordinates of which are known, and the position and pose of the MDOF robot 2 are recorded; the calibration plate is kept still, the position and pose of the MDOF robot 2 are changed multiple times to photograph the calibration plate, wherein two different times of photographing may be expressed as: $^{robot1}T_{base} \cdot {}^{cam1}T_{robot1} \cdot {}^{obj}T_{cam1} = {}^{robot2}T_{base} \cdot {}^{cam2}T_{robot2} \cdot {}^{obj}T_{cam2}$;

Because a coordinate relation between the camera and the tail end of the MDOF robot is constant, that is, $^{cam1}T_{robot1} = {}^{cam2}T_{robot2} = {}^{cam}T_{robot}$, $(^{robot2}T^{-1}_{base} \cdot {}^{robot1}T_{base}) \cdot {}^{cam}T_{robot} = {}^{cam}T_{robot} \cdot (^{obj}T_{cam2} \cdot {}^{obj}T^{-1}_{cam1})$ The equation is solved through multiple times of photographing to obtain a coordinate transformation relation $^{cam}T_{robot}$ between the 3D camera 5 and the MDOF robot 2;

A hand-eye transformation relation $^{cam}T_{tool}$ of the 3D camera 5 is: $^{cam}T_{tool} = {}^{cam}T_{robot} \cdot {}^{robot}T_{base} \cdot {}^{base}T_{tool} = {}^{cam}T_{robot} \cdot {}^{robot}T_{base} \cdot {}^{tool}T^{-1}_{base}$;

(2.13) Closed-loop control is performed to obtain a transformation relation between the coordinate system of the 3D camera 5 and a tool coordinate system of a tail end of the welding gun 7; preferably, to improve the calibration accuracy, the following step is added: the tail end of the welding gun touches a known point on the calibration plate to obtain the position P'(x,y,z) of the known point in the tool coordinate system of the MDOF robot 2, and the calibration plate is photographed by the 3D camera to obtain the position P"(x,y,z) of the known point in the coordinate system of the 3D camera; an energy equation representing a spatial distance between P'(x,y,z) and P"(x,y,z) is substituted into the optimization process, and with $^{cam}T_{tool}$ as an initial value, closed-loop iteration is performed to solve an optimal hand-eye transformation matrix $^{cam}T_{tool}$; no matter whether closed-loop control is used for optimization, the hand-eye transformation matrix mentioned below is the optimal hand-eye transformation matrix $^{cam}T_{tool}$ obtained in this step;

The energy equation is: $P = |P'_1(x,y,z)P"_1(x,y,z)| + |P'_2(x,y,z)P"_2(x,y,z)| + \ldots$ Where, $|P'_1(x,y,z)P"_1(x,y,z)|$ represents an Euclidean distance from $P'_1(x,y,z)$ to $P"_1(x,y,z)$, and the subscript represents multiple points;
(2.2) A TCP coordinate system of the robot is calibrated to obtain a position transformation relation of a sharp end of the welding gun 7 in the coordinate system of the MDOF robot 2;
A TCP calibration method of the robot is a direct input method, a four-point method or a six-point method. In this embodiment, the four-point method is used for TCP calibration;
(2.21) A new TCP coordinate system of the robot is established;

(2.22) A fixed point is placed in the working space of the MDOF robot 2, wherein the fixed point is generally a conical sharp point;

(2.23) The pose of the MDOF robot 2 is controlled to make a TCP be overlapped with the fixed point in the working space;

(2.24) The above step is repeated three times to enable TCPs to move to the same point by changing the pose of the MDOF robot 2;

(2.25) Under the condition where the coordinates of the four TCPs in a world coordinate system are identical, an equation set is established and is solved to realize position calibration of the tool coordinate system, such that a pose transformation relation of the coordinates of the tail end of the welding gun 7 of the welding system in the coordinate system of the MDOF robot 2 is obtained;

(2.3) The coordinate system of the MDOF robot and the coordinate system of the mobile robot are calibrated to obtain a matrix for transforming the coordinate system of the MDOF robot to the coordinate system of the mobile robot;

The 3D camera is mounted on the MDOF robot to photograph the calibration plate, the coordinates of which are known, and the position and pose of the mobile robot 3 are recorded; the calibration plate is kept still, the position of the mobile robot 3 is changed multiple times as significantly as possible, and then the robot is adjusted to photograph the calibration plate again according to the transformation relation $^{cam}T_{robot}$ between the camera and the robot, wherein two different times of photographing may be expressed as: $^{base}T_{BASE}{}^{robot1}T_{base}{}^{cam}T_{robot}{}^{obj}T_{cam1}={}^{base}T_{BASE}{}^{robot2}T_{base}{}^{cam}T_{robot}{}^{obj}T_{cam2}$;

The equation is solved through multiple times of photographing to obtain a transformation relation $^{base}T_{BASE}$ between a base coordinate system of the mobile robot 3 and the basic coordinate system of the system.

In Step (3), an origin of a workpiece coordinate system is set at a position where working features are obvious, preferably the intersection of multiple planes, or an angular point, which is beneficial to alignment. An X-direction, a Y-direction and a Z-direction of the workpiece coordinate system should be consistent with main structural feature directions; preferably, a longest dimension direction is selected as the X-direction, which is beneficial to placement. As an alternative solution, two or more limit mechanisms may be arranged in the X-direction to make the workpiece aligned with the X-axis. That is, the target workpiece 1 is placed in the working area of the basic plane, then a support structure is adjusted to enable the X-direction, Y-direction and Z-direction of the workpiece coordinate system to be basically overlapped with the X-direction, Y-direction and Z-direction of the basic coordinate system, which means that the angle error is within 2°.

Then, the origin of the workpiece coordinate system is photographed by the 3D camera 5 to extract origin features the workpiece coordinate system, then coordinates of the origin of the workpiece coordinate system are transformed to the basic coordinate system of the robot system to obtain a transformation relation between the workpiece coordinate system and the basic coordinate system, and then, the position of the workpiece in the basic coordinate system is obtained.

Step (3) specifically comprises the following sub-steps:

(3.1) The mobile robot 3 is controlled to move close to a target point, and the MDOF robot 2 is controlled to ensure that the 3D camera 5 can photograph the target point;

(3.2) A point cloud is photographed and uploaded to the industrial personal computer 8 to be processed;

(3.3) Data processing is performed according to the originally selected origin of coordinates of the workpiece, and in this embodiment, the origin of coordinates of the workpiece is the intersection of three planes; plane fitting is performed on the three-dimensional point cloud to find three planes, and then, the intersection O(x, y, z) of the three planes is solved, wherein O(x, y, z) is coordinates in the coordinate system of the camera;

(3.4) O(x, y, z) is transformed to the basic coordinate system: $O_{base}(x,y,z) = {}^{cam}T_{robot}\Box' \ldots \Box(\ )$.

Because the workpiece coordinate system can only be subjected to translation transformation with respect to the basic coordinate system, transformation values of the coordinates of the workpiece to the basic coordinate system in three directions are $(-X_T, -Y_T, -Z_T)$.

As an alternative solution, the sharp end of the welding gun of the MDOF robot touches the origin of the workpiece coordinate system, then the coordinates of the origin of the workpiece coordinate system are transformed to the basic coordinate system of the robot system to obtain the transformation relation between the workpiece coordinate system and the basic coordinate system, and then, the position of the workpiece in the basic coordinate system is obtained. The specific implementation has been described above.

When a robot program is generated off-line, and translation transformation is performed on position information generated in the robot program based on the workpiece coordinate system.

In Step (4), the motion path of the robot, and the photographing position and pose of the camera are planned, wherein one photographing position and pose of the camera may correspond to one or more welding features, or multiple photographing positions and poses correspond to one welding feature, and the welding feature is a target welding position, which is a point, a line or a curve; the photographing position and pose of the camera should be a position and pose where the camera can easily photograph a target feature; when the camera is at this position and pose, the camera is located within an effective working range, the target feature is within the field range of the camera, and a principal normal direction of an area where the target feature is located should be parallel to a Z-direction of the camera to the maximum extent to realize an optimal photographing effect. The motion path of the robot is a shortest safety path for the robot to move to a target position, and at the target position, the arm reach and degree of freedom of the robot should allow the camera to reach a target photographing position and pose;

The motion path of the robot, and the photographing position and pose of the camera are planned by means of off-line programming software through a parameterization method and is implemented through a teaching method.

In step (5), the motion control and welding programs comprise: a motion control program of the mobile robot 3, and a control program and welding program of the MDOF robot 2.

Preferably, the MDOF robot 2 is used as main control to communicate with and control the mobile robot 3, the 3D camera and the welding system.

As an alternative solution, the industrial personal computer 8 is used as main control to control the mobile robot 3, the MDOF robot 2 and the welding system.

As an alternative solution, an external PLC is used as main control to control the mobile robot 3, the MDOF robot 2 and the welding system.

The control program of the MDOF robot 2 comprises a motion control program of the robot arm, a communication program between the MDOF robot 2 and the camera, and a communication program between the MDOF robot 2, the welding system and the mobile robot.

The programs comprise: template programs manually written off-line, programs generated by off-line programming software using digital-analog drive, and a teach program generated by the teach pendant. The robot programs meet grammatical rules and data formats of robots of corresponding brands, and are able to run directly on the robots of the corresponding brands. If the programs are the template programs manually written off-line or the programs generated by off-line programming software using digital-analog drive, the robot programs are issued to controllers of the robots before running, which is realized through wired or wireless transmission or through copying by means of a memory device. In another implementation of the invention, an upper computer is used to control the robots to run the programs on-line, so the programs do not need to be issued to the controllers of the robots.

(6.1) First, the MDOF robot 2 and the mobile robot 3 are controlled to return to the origin of coordinates;

(6.2) Next, the mobile robot 3 is controlled to reach a first target position $P_1$;

(6.3) Then, at $P_1$, the MDOF robot 2 is controlled to reach a first photographing position, then photographing is performed, and data is sent to the industrial personal computer 8 to be processed; if there is another photographing position at $P_1$, the MDOF robot 2 continues to move to the next photographing position, then photographing is performed, and data is uploaded to the industrial personal computer 8; this step is repeated until all photographing tasks at $P_1$ are completed;

(6.4) All point cloud information at $P_1$ is fused by the industrial personal computer 8, and key information of welding features is recognized, wherein the key information of the welding features is key point information of the welding features which are recognized through a geometric algorithm or a neural network method, with 3D point clouds as inputs; the key point information comprises an initial point, end point and direction of a segment, spline curve parameters, arc parameters, and coordinates of multiple discrete points;

As an alternative solution, the key feature information is recognized first, then features are fused to obtain new key feature information, wherein the new key feature information comprises an initial point, end point and direction of a segment, spline curve parameters, arc parameters, and coordinates of multiple discrete points;

Point locations and direction information have been transformed to the basic coordinate system of the system;

(6.5) A track of the welding gun is calculated according to the key point information, wherein the track of the welding gun comprises position and pose information of the welding gun;

(6.6) The track of the welding gun 7 is sent to the controller 10, the controller 10 guides the mobile robot 3 to move after receiving the track of the welding gun 7, and the corresponding welding program is called to perform welding;

(6.7) The mobile robot 3 moves to a position $P_2$ for another cycle, and Steps (6.3)-(6.6) are repeated until welding is completed or stopped.

It should be noted that the term "comprise"/"include" used in the specification should be construed as the presence of features, integers, steps or components referred to, but shall not exclusive of the presence or addition of one or more other features, integers, steps or components.

The features of the method described above and below may be implemented through software, and can be implemented on a data processing system or other processing tools by executing a computer-executable instruction. The instruction may be a program code and is loaded into a memory (such as RAM) from a storage medium, or from another computer through the computer network. Or, the features may be realized through a hard-wired circuit instead of software, or be realized through both the hard-wired circuit and the software.

What is claimed is:

1. An automatic welding method for large structural parts based on hybrid robots and 3D vision based on a welding system, which comprises a hybrid robot system composed of a mobile robot (3) and a Multi-Degree-Of-Freedom (MDOF) robot (2) installed above the mobile robot (3), the welding system installed at a tail end of the MDOF robot (2) and used for welding a target workpiece (1), and a 3D vision system installed at the tail end of the MDOF robot (2) or on the welding system, and used for global calibration and positioning of the hybrid robot system, the welding system and the target workpiece;

wherein the mobile robot (3) comprises a mobile robot chassis (13); a shell (15) being fixedly disposed on the mobile robot chassis (13); a rechargeable battery pack (11) and a power supply (12) used for providing energy for the whole system, a controller (10) of the MDOF robot (2), and a welding machine (9) of the welding system being disposed in the shell (15); the rechargeable battery pack (11) being connected to an external power supply through a power port (14) on the shell (15);

the MDOF robot (2) comprises an MDOF robot body (6), and the MDOF robot body (6) and a teach pendant being in a signal connection with the controller (10) of the MDOF robot (2) in the shell (15) through cables;

the welding system comprises the welding machine (9) located in the shell (15), and a welding gun (7) connected to the welding machine (9) and disposed at the tail end of the MDOF robot body (6);

the 3D vision system comprises a 3D camera (5), the 3D camera (5) being installed at the tail end of the MDOF robot body (6) or on the welding gun (7), and being connected to an industrial personal computer (8) on the shell (15) through a cable, and the industrial personal computer (8) being connected to the controller (10) of the MDOF robot (2) through a cable;

the 3D camera (5) has a measurement accuracy not lower than 0.5 mm, and a deep frame rate greater than one frame per second; and the MDOF robot (2) comprises a robot arm with more than six degrees of freedom, and an arm reach of the robot arm being 0.5 m-2 m;

wherein the welding method comprises the steps of:

step (1) establishing a coordinate system of the hybrid robot system formed by the mobile robot (3) and the MDOF robot (2);

step (2) calibrating a relation between the welding system and the coordinate system of the hybrid robot system and a relation between the 3D vision system and the coordinate system of the hybrid robot system;

step (3) placing the target workpiece (1) in a working area, and aligning coordinates of the workpiece to a global coordinate system;

step (4) planning a motion path of the mobile robot (3), and a photographing position and pose of the 3D camera (5) in the 3D vision system;

step (5) generating motion control and welding programs; and step (6) performing welding by the mobile robot (3);

wherein step (2) further comprises the steps of:

step (2.1) calibrating a coordinate relation between the MDOF robot (2) and the 3D camera (5) to obtain a transformation relation between the coordinate system of the vision system of the camera and a coordinate system of the MDOF robot (2);

step (2.11) ensuring that the 3D camera (5) is calibrated, and obtaining intrinsic parameters of the camera, wherein the intrinsic parameters comprise: focal length, position of a principal point, pixel size, resolution, and distortion parameters;

step (2.12) calibrating the 3D camera (5) and the MDOF robot (2), defining a homogeneous transformation matrix from the tail end of the MDOF robot (2) to a base of the robot as $^{robot}T_{base}$, and similarly, defining a transformation matrix from the 3D camera (5) to a target object as $^{cam}T_{obj}$; mounting the 3D camera (5) on the MDOF robot (2), photographing a calibration plate, coordinates of which are known, and recording a position and pose of the MDOF robot (2); keeping the calibration plate still, changing the position and pose of the MDOF robot (2) multiple times to photograph the calibration plate, wherein two different times of photographing are expressed as: $^{robot1}T_{base} \cdot {}^{cam1}T_{robot1} \cdot {}^{obj}T_{cam1} = {}^{robot2}T_{base} \cdot {}^{cam2}T_{robot2} \cdot {}^{obj}T_{cam2}$;

$$^{robot1}T_{base} \cdot {}^{cam1}T_{robot1} \cdot {}^{obj}T_{cam1} = {}^{robot2}T_{base} \cdot {}^{cam2}T_{robot2} \cdot {}^{obj}T_{cam2} \quad (1)$$

wherein a coordinate relation between the camera and the tail end of the MDOF robot is constant, that is, $^{cam1}T_{robot1} = {}^{cam2}T_{robot2} = {}^{cam}T_{robot}$, $$^{cam1}T_{robot1} = {}^{cam2}T_{robot2} = {}^{cam}T_{robot} \quad (2)$$

$$(^{robot2}T^{-1}_{base} \cdot {}^{robot1}T_{base}) \cdot {}^{cam}T_{robot} = {}^{cam}T_{robot} \cdot \\ ({}^{obj}T_{cam2} \cdot {}^{obj}T^{-1}_{cam1}) \quad (3)$$

the equation is solved through multiple times of photographing to obtain a coordinate transformation relation $^{cam}T_{robot}$ between the 3D camera (5) and the MDOF robot (2);

a hand-eye transformation relation $^{cam}T_{tool}$ of the 3D camera (5) is:

$$^{cam}T_{tool} = {}^{cam}T_{robot} \cdot {}^{robot}T_{base} \cdot {}^{base}T_{tool} = {}^{cam}T_{robot} \cdot {}^{robot}T_{base} \cdot {}^{tool}T^{-1}_{base} \quad (4)$$

step (2.13) performing closed-loop control to obtain a transformation relation between a coordinate system of the 3D camera (5) and a tool coordinate system of a tail end of the welding gun (7), touching a known point on the calibration plate by the tail end of the welding gun to obtain a position P'(x,y,z) of the known point in the coordinate system of the MDOF robot (2), photographing the calibration plate by the 3D camera to obtain a position P''(x,y,z) of the known point in the coordinate system of the 3D camera, substituting an energy equation representing a spatial distance between P'(x,y,z) and P''(x,y,z) into formula (4) to obtain an initial value of the hand-eye transformation relation $^{cam}T_{tool}$, and performing closed-loop iteration to solve an optimal hand-eye transformation matrix $^{cam}T_{tool}$;

wherein, the energy equation is:

$$P = |P'_1(x,y,z)P'''_1(x,y,z)| + |P'_2(x,y,z)P'''_2(x,y,z)| + \ldots$$

where, $|P'_1(x,y,z)P'''_1(x,y,z)|$ represents an Euclidean distance from $P'_1(x,y,z)$ to $P'''_1(x,y,z)$, and the subscript represents multiple points;

step (2.2) calibrating a TCP coordinate system of the robot (2) to obtain a position transformation relation of a sharp end of the welding gun (7) in the coordinate system of the MDOF robot (2);

wherein a TCP calibration method of the robot is a direct input method, a four-point method or a six-point method, and the four-point method specifically comprises the steps of:

step (2.21) establishing a new TCP coordinate system of the MDOF robot;

step (2.22) placing a fixed point in a working space of the MDOF robot (2), wherein the fixed point is generally a conical sharp point;

step (2.23) controlling the pose of the MDOF robot (2) to make a TCP be overlapped with the fixed point in the working space;

step (2.24) repeating Step (2.23) three times to enable TCPs to move to the same point by changing the pose of the MDOF robot (2); and step (2.25) under the condition where coordinates of the four TCPs in a world coordinate system are identical, establishing an equation set, solving the equation set to realize position calibration of the tool coordinate system, such that a pose transformation relation of coordinates of the tail end of the welding gun (7) of the welding system in the coordinate system of the MDOF robot (2) is obtained; and step (2.3) calibrating the coordinate system of the MDOF robot and a coordinate system of the mobile robot to obtain a matrix for transforming the coordinate system of the MDOF robot to a coordinate system of the mobile robot;

wherein the welding method further comprises the steps of: mounting 3D camera on the MDOF robot (2) to photograph the calibration plate, the coordinates of which are known, and recording a position and pose of the mobile robot (3); keeping the calibration plate still, changing the position of the mobile robot (3) multiple times as significantly as possible, and then adjusting the robot to photograph the calibration plate again according to the coordinate transformation relation $^{cam}T_{robot}$ between the 3D camera and the tail end of the MDOF robot, wherein two different times of photographing are expressed as:

$$^{base}T_{BASE} \cdot {}^{robot1}T_{base} \cdot {}^{cam}T_{robot} \cdot {}^{obj}T_{cam1} = {}^{base}T_{BASE} \cdot {}^{robot2}T_{base} \cdot {}^{cam}T_{robot} \cdot {}^{obj}T_{cam2};$$

then photographing multiple times to solve the equation so as to obtain a transformation relation $^{base}T_{BASE}$ between a base coordinate system of the mobile robot (3) and the basic coordinate system of the system.

2. The automatic welding method according to claim 1, wherein step (1) specifically comprises the steps of:

step (1.1) enabling the mobile robot (3) carrying the MDOF robot (2), the 3D vision system and the welding system to move in a basic plane around the target workpiece (1), performing rough positioning by navigation, and expanding a working range in a direction perpendicular to the basic plane by ascending or descending;

wherein, the rough positioning by navigation is performed through one or more of an electromagnetic method, a two-dimensional code method, visual SLAM, visual tracking and inertial navigation; when the electromagnetic method or the two-dimensional code method is used, corresponding navigation lines (4) are laid on a ground; when the visual tracking is used for positioning the mobile robot (3), one or more tracking targets (16) are printed on the shell (15) of the mobile robot (3), and extra cameras photograph the target to determine the position of the mobile robot; and step (1.2) establishing the coordinate system of the mobile robot (3), wherein an origin of the coordinate system is a fixed point in the basic plane, an XY plane is overlapped with the basic plane, a Z-direction is perpendicular to the basic plane, and the coordinate system is a global basic coordinate system; establishing the coordinate system of the MDOF robot (2), wherein an origin of the coordinate system is located on a base of the robot arm, and an X-direction, a Y-direction and a Z-direction are overlapped with those of the coordinate system of the mobile robot (3); establishing the coordinate system of the 3D vision system, wherein an original of the coordinate system is an optical center of a lens of the 3D camera (5), an X-direction of the coordinate system is an optical center of a projection system to which the optical center of the lens of the 3D camera points, a Y-direction is perpendicular to the X-direction and is parallel to an imaging chip of the camera, and a Z-direction is perpendicular to the XY plane and points right ahead the camera.

3. The automatic welding method according to claim 1, wherein in step (3), an origin of a workpiece coordinate system is set at a position where working features are obvious, and this position is an intersection of multiple planes, or an angular point, which is beneficial to alignment; an X-direction, a Y-direction and a Z-direction of the workpiece coordinate system are consistent with main structural feature directions; that is, the target workpiece (1) is placed in a working area of the basic plane, then a support structure is adjusted to enable the X-direction, Y-direction and Z-direction of the workpiece coordinate system to be basically overlapped with the X-direction, Y-direction and Z-direction of the basic coordinate system, which means that an angle error therebetween is within 2°; then, the origin of the workpiece coordinate system is photographed by the 3D camera (5) to extract origin features the workpiece coordinate system, then coordinates of the origin of the workpiece coordinate system are transformed to the basic coordinate system to obtain a transformation relation between the workpiece coordinate system and the basic coordinate system, and then, the position of the workpiece in the basic coordinate system is obtained.

4. The automatic welding method according to claim 1, wherein step (3) specifically comprises the steps of:
(3.1) controlling the mobile robot (3) to move close to a target point, and controlling the MDOF robot (2) to ensure that the 3D camera (5) can photograph the target point;
(3.2) photographing a point cloud, and uploaded the point cloud to the industrial personal computer (8) to be processed;
(3.3) performing data processing according to the originally selected origin of coordinates of the workpiece, performing plane fitting on the three-dimensional point cloud to find three planes, and solving an intersection O(x, y, z) of the three planes, wherein O(x, y, z) is coordinates in the coordinate system of the camera; and
(3.4) transforming O(x, y, z) to the basic coordinate system: $O_{base}(x,y,z) = {}^{cam}T_{robot} \Box {}^{robot}T_{base} \Box O(x,y,z)$;
wherein the workpiece coordinate system is subjected to translation transformation with respect to the basic coordinate system, transformation values of the coordinates of the workpiece to the basic coordinate system in three directions are $(-X_T, -Y_T, -Z_T)$.

5. The automatic welding method according to claim 1, wherein in step (4), the motion path of the robot, and the photographing position and pose of the camera are planned; one photographing position and pose of the camera corresponds to one or more welding features, or multiple photographing positions and poses correspond to one welding feature, and the welding feature is a target welding position, which is a point, a line or a curve; the photographing position and pose of the camera is a position and pose where the camera can photograph a target feature; when the camera is at this position and pose, the camera is located within an effective working range, the target feature is within a field range of the camera, and a principal normal direction of an area where the target feature is located is parallel to a Z-direction of the camera to the maximum extent to realize an optimal photographing effect; and the motion path of the robot is a shortest safety path for the robot to move to a target position, and at the target position, the arm reach and degree of freedom of the robot should allow the camera to reach a target photographing position and pose;

the motion path of the robot, and the photographing position and pose of the camera are planned by means of off-line programming software through a parameterization method and is implemented through a teaching method.

6. The automatic welding method according to claim 1, wherein in step (5), the motion control and welding programs comprise: a motion control program of the mobile robot (3), and a control program and welding program of the MDOF robot (2);

the control program of the MDOF robot (2) comprises a motion control program of the robot arm, a communication program between the MDOF robot (2) and the camera, and a communication program between the MDOF robot (2), the welding system and the mobile robot;

the programs comprise: template programs manually written off-line, programs generated by off-line programming software using digital-analog drive, and a teach program generated by the teach pendant; the robot programs meet grammatical rules and data formats of robots of corresponding brands, and are able to run directly on the robots of the corresponding brands; if the programs are the template programs manually written off-line or the programs generated by off-line programming software using digital-analog drive, the robot programs are issued to controllers of the robots before running, which is realized through wired or wireless transmission or through copying by means of a memory device.

7. The automatic welding method according to claim 1, wherein step (6) comprises the steps of:
(6.1) controlling the MDOF robot (2) and the mobile robot (3) to return to the origin of coordinates;
(6.2) controlling the mobile robot (3) to reach a first target position $P_1$;
(6.3) at $P_1$, controlling the MDOF robot (2) to reach a first photographing position, then performing photographing, and sending data to the industrial personal computer (8) to be processed; if there is another photographing position at $P_1$, controlling the MDOF robot (2) to continue to move to the next photographing position, then performing photographing, and uploading data to the industrial personal computer (8); repeating step (6.3) until all photographing tasks at $P_1$ are completed;

(6.4) fusing all point cloud information at $P_1$ by the industrial personal computer (8), and recognizing key information of welding features, wherein the key information of the welding features is key point information of the welding features which are recognized through a geometric algorithm or a neural network method, with 3D point clouds as inputs; the key point information comprises an initial point, end point and direction of a segment, spline curve parameters, arc parameters, and coordinates of multiple discrete points;

(6.5) calculating a track of the welding gun according to the key point information, wherein the track of the welding gun comprises position and pose information of the welding gun;

(6.6) sending the track of the welding gun (7) to the controller (10) of the MDOF robot (2), guiding, by the controller (10), the mobile robot (3) to move after the controller (10) of the MDOF robot (2) receives the track of the welding gun (7), and calling the corresponding welding program to perform welding; and (6.7) controlling the mobile robot (3) to move to a position $P_2$ for another cycle, and repeating Steps (6.3)-(6.6) until welding is completed or stopped.

* * * * *